United States Patent
Bang et al.

(10) Patent No.: US 7,899,138 B2
(45) Date of Patent: Mar. 1, 2011

(54) METHOD OF DETECTING SPACE-TIME CODE IN MOBILE COMMUNICATION SYSTEM WITH 4 TX ANTENNA

(75) Inventors: Young-Jo Bang, Daejeon (KR); Chang-Wahn Yu, Daejeon (KR); Seung-Jae Bahng, Daejeon (KR); Dae-Ho Kim, Daejeon (KR); Youn-Ok Park, Daejeon (KR); Jee-Hwan Ahn, Daejeon (KR); Il Min Kim, Suwon-si (KR)

(73) Assignee: Samsung Electronics Co. Ltd, Suwon-si (KR)

( * ) Notice: Subject to any disclaimer, the term of this patent is extended or adjusted under 35 U.S.C. 154(b) by 694 days.

(21) Appl. No.: 11/930,013

(22) Filed: Oct. 30, 2007

(65) Prior Publication Data
US 2008/0137781 A1    Jun. 12, 2008

(30) Foreign Application Priority Data
Dec. 7, 2006   (KR) .................. 10-2006-0123915

(51) Int. Cl.
*H04L 27/06* (2006.01)
*H03D 1/00* (2006.01)
(52) U.S. Cl. ........................... 375/340; 375/347
(58) Field of Classification Search .......... 375/259–260, 375/267, 346–347, 349, 340–342
See application file for complete search history.

(56) References Cited

U.S. PATENT DOCUMENTS

| | | | |
|---|---|---|---|
| 7,190,734 B2 | 3/2007 | Giannakis et al. | |
| 7,443,928 B2 | 10/2008 | Nefedov et al. | |
| 7,469,014 B2 * | 12/2008 | Abe et al. | 375/262 |
| 7,489,746 B1 * | 2/2009 | Awater et al. | 375/341 |
| 7,583,723 B2 * | 9/2009 | Heikkila | 375/148 |
| 7,676,007 B1 * | 3/2010 | Choi et al. | 375/347 |

(Continued)

FOREIGN PATENT DOCUMENTS

KR    10-2004-0019296 A    3/2004

(Continued)

OTHER PUBLICATIONS

Zongkai Yang, Chao Liu and Jianhua He, "A New Approach for Fast Generalized Sphere Decoding in MIMO System", IEEE Signal Processing Letters, vol. 12, No. 1, pp. 41-44, Jan. 2006.

Mohamed Oussama Damen, Karim Abed-Meraim and Jean-Claude Belfiore, "Generalized Sphere Decoder for Asymmetrical Space-time Communication Architecture", IEEE Electronic Letters, vol. 36, beginning at p. 166, Jan. 2000.

(Continued)

*Primary Examiner* — Jean B Corrielus
(74) *Attorney, Agent, or Firm* — Jefferson IP Law, LLP (57) ABSTRACT

The present invention relates to a method of detecting a space-time code in a mobile communication system. When detecting a space-time code B for a plurality of transmitting antennas, an ML (maximum likelihood) metric, which is generally calculated by using a specific structure of a matrix B, is defined as a new ML metric by reducing a variable of the ML metric. Two dependent sphere decoding processes are performed and an intersection of the decoding results is calculated, and a signal is detected from the ML metric. Therefore, since detection of the space-time code B for the plurality of transmitting antennas is performed by using the newly defined ML metric, an amount of matrix calculated can be reduced, and a calculation amount can be reduced by performing the two dependent sphere decoding processes. Further, since a detection order of symbols is changed according to a channel situation, it is possible to improve the performance of the system.

13 Claims, 6 Drawing Sheets

U.S. PATENT DOCUMENTS

2006/0050804 A1 3/2006 Leclair
2007/0136648 A1 6/2007 Kwon et al.

FOREIGN PATENT DOCUMENTS

| KR | 10-2006-0039015 A | 5/2006 |
|---|---|---|
| KR | 1020060043724 A | 5/2006 |
| KR | 10-0651036 B1 | 11/2006 |
| KR | 10-2007-0059659 A | 6/2007 |
| WO | 2007066935 A2 | 6/2007 |

OTHER PUBLICATIONS

Pranav Dayal and Mahesh K. Varanasi, "A Fast Generalized Sphere Decoder for Optimum Decoding of Under-determined MIMO Systems," Proc. 41st Annu. Allerton Conf. Communication, Control, and Computing, Monticello, IL, pp. 1216-1225, Oct. 2003.

* cited by examiner

METHOD OF DETECTING SPACE-TIME CODE IN MOBILE COMMUNICATION SYSTEM WITH 4 TX ANTENNA

CROSS-REFERENCE TO RELATED APPLICATION

This application claims priority to and the benefit of Korean Patent Application No. 10-2006-0123915 filed in the Korean Intellectual Property Office on Dec. 7, 2006, the entire contents of which are incorporated herein by reference.

BACKGROUND OF THE INVENTION (a) Field of the Invention

The present invention relates to a mobile communication system, and more particularly, to a method of detecting a space-time code.

(b) Description of the Related Art

In general, WiBro, which is a field of a mobile communication system, means a portable Internet system that has two meanings of "wireless" and "wideband". A Wibro system has been defined as a system that satisfies the standard established by IEEE 802.16 and five performance criteria, by the Ministry of Information and Communication on Jul. 29, 2004. Here, the five performance criteria include that $\hat{1}$ when a mobile terminal moves at a speed of 60 km/h, a data transmission rate of at least 512 kbps during a downlink and a data transmission rate of at least 128 kbps during an uplink are ensured at cell interfaces, $\hat{2}$ a channel bandwidth is 9 MHz or more, $\hat{3}$ a roaming process of communication equipment needs to be performed between service providers, $\hat{4}$ a frequency reuse coefficient is 1, and $\hat{5}$ a TDD method is used to minimize interference between frequencies, while transmitting/receiving time slots synchronize with each other.

In the IEEE 802.16e, when there are four transmitting antennas in a system, three usable space-time codes are defined. The three space-time codes are represented by three matrices A, B, and C, respectively, and each space-time code has a different symbol transmission rate and diversity gain. Among them, particularly, the space-time code B has a superior trade-off performance for the symbol transmission rate and the diversity gain, as follows.

$$B = \begin{bmatrix} s_1 & -s_2^* s_5 & -s_7^* \\ s_2 s_1^* s_6 & -s_8^* \\ s_3 & -s_4^* s_7 s_5^* \\ s_4 s_3^* s_8 s_6^* \end{bmatrix}$$

In this case, the vertical axis indicates an antenna. It can be understood that four symbols are simultaneously transmitted from four antennas. The horizontal axis indicates time or a carrier frequency.

When symbols are transmitted by using the given space-time code, the symbols are simultaneously received by a receiving terminal. Thus, the entire performance of a system depends on an efficient detection method in the receiving terminal. Among detection methods that have been proposed in the related art, a maximum likelihood (ML) detection method is most superior in terms of performance.

However, the ML detection method is very complicated. In particular, in the case of when a magnitude of a constellation increases (e.g., in the case of 16-QAM or 64-QAM), since complexity of the system is increased, it is not possible to perform the ML detection in real time.

In order to provide optimal ML performance while the complexity of the system is reduced, a sphere decoding scheme has been proposed. In the sphere decoding scheme, since a test is performed on constellation points that exist near the received signals, complexity is alleviated as compared with the case of the simple ML detection method according to the related art.

However, when considering a downlink, the size of a mobile terminal is generally restricted. Therefore, it is difficult for a plurality of receiving antennas to be located at one mobile terminal. Actually, in the WiBro system, even though two or more receiving antennas are defined in one mobile terminal, a plurality of mobile terminals have a number of receiving antennas that is smaller than a number of transmitting terminals.

In particular, a scheme that is entitled "A new approach for fast generalized sphere decoding in MIMO systems" that was proposed by Z. Yang, C. Liu and J. He and disclosed in IEEE Signal Processing Letters, has been known as the fastest sphere decoding scheme when the number of receiving antennas is smaller than the number of transmitting antennas. However, as in the WiBro system, in the case where four transmitting antennas exist and the magnitude of the constellation is large, an algorithm is very complex. As a result, it is difficult to use the scheme in the system.

Examples of a method of reducing the complexity of a system and providing suboptimal performance include ZF (Zero-Forcing), MMSE (Minimum Mean Squared Error), SIC (ZF with Successive Interference Cancellation), MMSE with SIC, and the like. However, since these methods cannot provide the ML performance, they are inferior to the sphere decoding scheme that can ensure the ML performance.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of detecting a space-time code, having advantages of detecting the space-time code in a mobile communication system where a plurality of transmitting antennas are provided.

An exemplary embodiment of the present invention provides a method of detecting a space-time code for a plurality of transmitting antennas. The method includes receiving signals transmitted from the plurality of transmitting antennas and determining channel statuses of the received signals for the transmitting antennas to determine a detection order of symbol groups, the received signals being divided into a first symbol group and a second symbol group each of which includes a pair of a first symbol and a second symbol, each symbol including imaginary and real parts each having one or more bits; calculating an ML (maximum likelihood) metric for the first symbol group if a detection on the first symbol group is determined according to the channel statuses; performing sphere decoding on the calculated ML metric and sequentially detecting an imaginary part of one bit and a real part of one bit for the first symbol and the second symbol of the first symbol group; and detecting the second symbol group as a single symbol on the basis of the detected first symbol group.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

Before describing an exemplary embodiment of the present invention, an assumption about a space-time code B will be described.

A space-time code B is composed of a 4×4 matrix. But symbols that are completely different from symbols that are transmitted in first and second columns are transmitted in third and fourth columns, and a receiving terminal receives a space-time code at a different time slot or frequency. Thus, it is assumed that space-time codes are generated only in consideration of the first and second columns, as represented by Equation 1.

$$X = \begin{Vmatrix} x_1 - x_2^* \\ x_2 x_1^* \\ x_3 - x_4^* \\ x_4 x_3^* \end{Vmatrix} \quad \text{(Equation 1)}$$

On the assumption, a space-time codes detecting system according to an exemplary embodiment of the present invention will be described with reference to FIG. 1.

Figure 1:
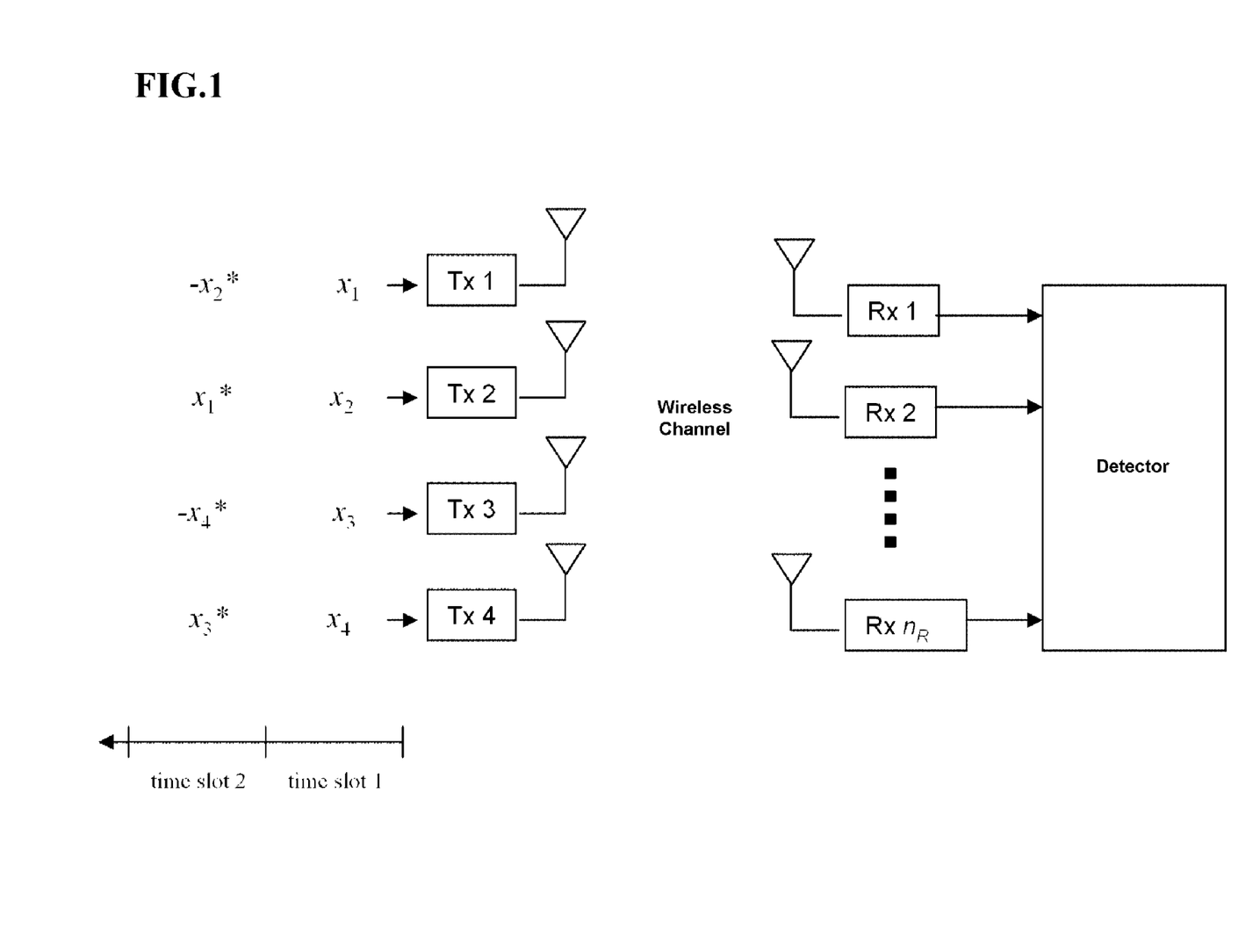
FIG. 1 is a schematic diagram illustrating a system according to an exemplary embodiment of the present invention.

FIG. 1 is a schematic diagram illustrating a wireless communication system according to an exemplary embodiment of the present invention.

As shown in FIG. 1, the wireless communication system comprises a transmitter with 4 transmitting antenna and a receiver with $n_R$ receiving antenna. The receiver has a detector.

In an exemplary embodiment of the present invention, a case that the number of receiving antennas is one will be described, then a case that the number of receiving antennas is $n_R$ will be described.

In case that one receiving antenna exists in a receiver, signals that are received in first and second time slots in the receiver are represented by Equation 2.

$$r1 = h_1 x_1 + h_2 x_2 + h_3 x_3 + h_4 x_4 + n_1$$

$$r2 = -h_1 x_2^* + h_2 x_1^* - h_3 x_4^* + h_4 x_3^* + n_2 \quad \text{(Equation 2)}$$

In this case, $h_j$ indicates a channel gain between a j-th transmitting antenna and a receiving antenna. In addition, $n_i$ indicates white noise in an i-th time slot. In this case, ML (maximum likelihood) detection is performed as represented by Equation 3.

$$(x_1^{opt}, x_2^{opt}, x_3^{opt}, x_4^{opt}) = \arg \min_{x1,x2,x3,x4 \in S} \overline{M} \quad \text{(Equation 3)}$$

In this case, S indicates a constellation, and an ML metric is given by Equation 4.

$$\overline{M} = |r_1 - h_1 x_1 - h_2 x_2 - h_3 x_3 - h_4 x_4|^2 + |r_2 + h_1 x_2^* - h_2 x_1^* + h_3 x_4^* - h_4 x_3^*|^2 \quad \text{(Equation 4)}$$

From Equation 4, the ML metric can be represented in Equation 5, which is an equation that is newly derived according to the exemplary embodiment of the present invention. In Equation 5, a matrix operation can be briefly performed by reducing the number of variables that are included in respective terms at the right side.

$$M = \|\alpha_0 - D_A X_A\|^2 + \|\beta_0 - D_B X_B\|^2 \quad \text{(Equation 5)}$$

A variety of vectors and matrices in Equation 5 are defined as follows.

$$\alpha_0 = [R[\alpha_0], \mathfrak{I}[\alpha_0]]^T$$

$$\beta_0 = [R[\beta_0], \mathfrak{I}[\beta_0]]^T$$

$$D_A = \begin{bmatrix} R[\alpha_1] - \mathfrak{I}[\alpha_1] R[\alpha_3] - \mathfrak{I}[\alpha_3] R[\alpha_4] - \mathfrak{I}[\alpha_4] \\ \mathfrak{I}[\alpha_1] R[\alpha_1] \mathfrak{I}[\alpha_3] R[\alpha_3] \mathfrak{I}[\alpha_4] R[\alpha_4] \end{bmatrix}$$

$$D_B = \begin{bmatrix} R[\beta_2] - \mathfrak{I}[\beta_2] R[\beta_3] - \mathfrak{I}[\beta_3] R[\beta_4] - \mathfrak{I}[\beta 4] \\ \mathfrak{I}[\beta_2] R[\beta_2] \mathfrak{I}[\beta_3] R[\beta_3] \mathfrak{I}[\beta_4] R[\beta_4] \end{bmatrix}$$

$$X_A := \begin{bmatrix} x_1^A \\ x_2^A \\ x_3^A \\ x_4^A \\ x_5^A \\ x_6^A \end{bmatrix} := \begin{bmatrix} R[x_1] \\ \mathfrak{I}[x_1] \\ R[x_3] \\ \mathfrak{I}[x_3] \\ R[x_4] \\ \mathfrak{I}[x_4] \end{bmatrix} \quad \begin{aligned} \alpha 1 &= \sqrt{|h_1|^2 + |h_2|^2} \\ \alpha_0 &= \frac{r_1 h_1^* + r_2^* h_2}{\alpha_1} \\ \alpha_3 &= \frac{h_1^* h_3 + h_2 h_4^*}{\alpha_1} \\ \alpha 4 &= \frac{h_1^* h_4 + h_1 h_3^*}{\alpha_1} \end{aligned}$$

$$X_B := \begin{bmatrix} x_1^B \\ x_2^B \\ x_3^B \\ x_4^B \\ x_5^B \\ x_6^B \end{bmatrix} := \begin{bmatrix} R[x_2] \\ \mathfrak{I}[x_2] \\ R[x_3] \\ \mathfrak{I}[x_3] \\ R[x_4] \\ \mathfrak{I}[x_4] \end{bmatrix} \quad \begin{aligned} \beta_2 &= \alpha_1 \\ \beta_0 &= \frac{r_1 h_2^* - r_2^* h_1}{\beta_2} \\ \beta_3 &= \frac{h_2^* h_3 - h_1 h_4^*}{\beta_2} \\ \beta_4 &= \frac{h_2^* h_4 + h_1 h_3^*}{\beta_2} \end{aligned}$$

Further, the ML metric of Equation 5 can be represented by Equation 6.

$$M = \|F_A(\rho_A - X_A)\|^2 + \|F_B(\rho_B - X_B)\|^2 \qquad \text{(Equation 6)}$$

In this case, the conditions $\rho_A = D_A^T(D_A D_A^T)^{-1}\alpha_0$ and $\rho_B = D_B^T(D_B D_B^T)^{-1}\beta_0$ are satisfied.

Further, the two matrices $F_A$ and $F_B$ are obtained by applying the normalized Cholesky decomposition to the two matrices $G_A = (D_A)^T D_A$ and $G_B = (D_B)^T D_B$. Further, Equation 6 can be represented as Equation 7.

$$M = \sum_{i=1}^{2}\left|\sum_{j=i}^{6} F_{ij}^A(\rho_j^A - x_j^A)\right|^2 + \sum_{i=1}^{2}\left|\sum_{j=i}^{6} F_{ij}^B(\rho_j^B - x_j^B)\right|^2 \qquad \text{(Equation 7)}$$

$$= \left|\sum_{j=1}^{6} F_{1j}^A(\rho_j^A - x_j^A)\right|^2 + \left|\sum_{j=2}^{6} F_{2j}^A(\rho_j^A - x_j^A)\right|^2 +$$

$$\left|\sum_{j=1}^{6} F_{1j}^B(\rho_j^B - x_j^B)\right|^2 + \left|\sum_{j=2}^{6} F_{2j}^B(\rho_j^B - x_j^B)\right|^2$$

Here, $\rho_j^A$ indicates the j-th element of $\rho_A$ and $F_{ij}^A$ indicates the (i, j)-th element of $F_A$. In this way, $\rho_j^B$ and $F_{ij}^B$ are defined.

In order to apply sphere decoding, the given ML metric M is restricted to be smaller than a constant C that is defined in advance. In this case, two necessary conditions are represented by Equations 8 and 9, respectively.

$$\left|\sum_{j=2}^{6} F_{2j}^A(\rho_j^A - x_j^A)\right|^2 \leq C \qquad \text{(Equation 8)}$$

$$\left|\sum_{j=2}^{6} F_{2j}^B(\rho_j^B - x_j^B)\right|^2 \leq C \qquad \text{(Equation 9)}$$

In the exemplary embodiment of the present invention, two dependent sphere decoding numerical formulas exist. In the exemplary embodiment of the present invention, it is assumed that $x_3$ and $x_4$ are detected and then x1 and x2 are detected. Further, it is assumed that each symbol has a 4-PSK constellation. That is, each symbol may have any one of four values of $\{1, -1, j, -j\}$.

Thus, each of $x^A_j$ and $x^B_j$ has a value of either +1 or −1. A sphere decoding scheme that is represented by Equation 8 will now be described.

$$\sum_{j=2}^{6} F_{2j}^A \rho_j^A - \sqrt{C} \leq \sum_{j=2}^{6} F_{2j}^A x_j^A \leq \sum_{j=2}^{6} F_{2j}^A \rho_j^A + \sqrt{C} \qquad \text{(Equation 10)}$$

If solving Equation 1 by applying a method that has been proposed by Z. Yang, $x^A_6$ can be estimated as represented by Equation 11.

$$x_6^A \in \{-1,1\} \cap [LB_6^A, UB_6^A] \qquad \text{(Equation 11)}$$

However, when $F^A_{2,6}$ is a positive number, $$LB_6^A = \frac{Q_A - \sqrt{C} - 2\sum_{j=2}^{5}|F_{2j}^A|}{|F_{2,6}^A|} - 1$$

$$UB_6^A = \frac{Q_A + \sqrt{C}}{|F_{2,6}^A|} - 1.$$

Further, when $F^A_{2,6}$ is a negative number, $$LB_6^A = -\frac{Q_A + \sqrt{C}}{|F_{2,6}^A|} + 1$$

$$UB_6^A = -\frac{Q_A - \sqrt{C} - 2\sum_{j=2}^{5}|F_{2j}^A|}{|F_{2,6}^A|} + 1.$$

In the same method, if solving Equation 9, the condition for $x^B_6$ can be obtained as follows.

$$x_6^A = x_6^B \Im|x_4|$$

Thus, the condition for an imaginary part of $x_4$ is given by Equation 12.

$$\Im[x_4] \in \{-1,1\} \cap [\max(LB_6^A, LB_6^B), \min(UB_6^A, UB_6^B)] \qquad \text{(Equation 12)}$$

If repeating the above-described method, the condition for $x^B_6$ can be obtained as follows.

$$X_5^A \in \{-1,1\} \cap [LB_5^A, UB_5^A]$$

When $F^A_{2,5}$ is a positive number, $$LB_5^A = \frac{QA - \sqrt{C} - 2\sum_{j=2}^{4}|F_{2j}^A| - 2\bar{u}_6^A}{|F_{2,5}^A|} - 1$$

$$UB_5^A = \frac{QA + \sqrt{C} - 2\bar{u}_6^A}{|F_{2,5}^A|} - 1$$

When $F^A_{2,5}$ is a negative number, $$LB_5^A = -\frac{Q_A + \sqrt{C} - 2\bar{u}_6^A}{|F_{2,5}^A|} + 1$$

$$UB_5^A = -\frac{QA - \sqrt{C} - 2\sum_{j=2}^{4}|F_{2j}^A| - 2\bar{u}_6^A}{|F_{2,5}^A|} + 1.$$

In the same method, if calculating Equation 9, the condition for $x^B_5$ can be obtained, and the condition for a real part of $x_4$ is given by Equation 13, similar to Equation 12.

$$\Re[x_4] \in \{-1,1\} \cap [\max(LB_5^A, LB_5^B), \min(UB_5^A, UB_5^B)] \qquad \text{(Equation 13)}$$

In this way, the conditions for imaginary and real parts of $x_3$ can be obtained as represented by Equations 14 and 15.

$$\Im[x_3] \in \{-1,1\} \cap [\max(LB_4^A, LB_4^B), \min(UB_4^A, UB_4^B)] \qquad \text{(Equation 14)}$$

$$\Re[x_3] \in \{-1,1\} \cap [\max(LB_3^A, LB_3^B), \min(UB_3^A, UB_3^B)] \qquad \text{(Equation 15)}$$

In order to display estimated values for imaginary and real parts of symbols that are calculated by using Equations 12 to 15, a bar - is displayed above each symbol. Finally, the estimated values for $x_3$ and $x_4$ are represented by Equation 16.

$\bar{x}_3 = \Re[\bar{x}_3] + j \cdot \Im[\bar{x}_3]$ $\bar{x}_4 = \Re[\bar{x}_4] + j \cdot \Im[\bar{x}_4]$ (Equation 16)

As described above, after detecting $x_3$ and $x_4$, $x_1$ and $x_2$ are detected as follows. In the exemplary embodiment of the present invention, different from a general method, an Alamouti decoding scheme instead of the sphere decoding scheme is applied to two remaining symbols.

First, if substituting the estimated values for $x_3$ and $x_4$ given by Equation 16 for Equation 2, Equation 17 is obtained.

$\tilde{r}_1 = h_1 x_1 + h_2 x_2 + n_1$ $\tilde{r}_2 = -h_1 x_2^* + h_2 x_1^* + n_2$ $\tilde{r}_1 = r_1 - h_3 \bar{x}_3 - h_4 \bar{x}_4$ $\tilde{r}_2 = r_2 + h_3 \bar{x}_4^* - h_4 \bar{x}_4$. (Equation 17)

Equation 17 shows a received signal in the case where an Alamouti decoding scheme is applied once. Thus, extremely simple detection can be performed, and the results that are obtained by detecting $x_1$ and $x_2$ are as follows.

$\bar{x}1 = \text{sign}(\hat{x}_1)$ (Equation 18)

$\bar{x}_2 = \text{sign}(\hat{x}_2)$ $\hat{x}_1 = \dfrac{\tilde{r}_1 h_1^* + \tilde{r}_2^* h_2}{|h_1|^2 + |h_2|^2}$ $\hat{x}_2 = \dfrac{\tilde{r}_1 h_2^* + \tilde{r}_2^* h_1}{|h_1|^2 + |h_2|^2}.$ In Equation 18, the sign means a signum function.

From Equation 18, the estimated values for real and imaginary parts of $x_1$ and $x_2$ can be simply calculated as follows.

$\Re[\bar{x}_1] = \Re[\bar{x}_1]$ $\Im[\bar{x}_1] = \Im[\bar{x}_1]$ $\Re[\bar{x}_2] = \Re[\bar{x}_2]$ $\Im[\bar{x}_1] = \Im[\bar{x}_1]$ (Equation 19)

Finally, estimated values for real and imaginary parts of $X_A$ and $X_B$ are obtained. In the description below, in order to indicate the estimated values, a bar - is additionally displayed. By using the estimated values that are calculated above, C' is calculated as represented by Equation 20.

$C' = \|\alpha_0 - D_A \bar{X}_A\|^2 + \|\beta_0 - D_B \bar{X}_B\|^2$ (Equation 20)

If the condition C'>C is satisfied, it means that there is no constellation point in a given radius C, like the existing sphere coding scheme. Thus, the C value is increased by a predetermined method. However, if the condition C'<C is satisfied, a constellation point exists.

Thus, first, Equation 7 is restricted to be smaller than or equal to the constant C. As a result, the two necessary conditions are derived. Then, the constant C is converted into the constant C'. The above-described processes are repeated until the constellation point is not discovered. In this case, the finally discovered constellation point becomes an ML estimated value.

The description has been given on the assumption that the number of receiving antennas is one. The description will be made on the assumption that $n_r$ receiving antennas exist. First, the ML metric, which has been represented by Equation 5, is represented by Equation 21.

$M = \|\vec{\alpha}_0 - \vec{D}_A X_A\|^2 + \|\vec{\beta}_0 - \vec{D}_B X_B\|^2$ (Equation 21)

where $\vec{\alpha}_0 = [\Re[\alpha_0^{(1)}], \Im[\alpha_0^{(1)}], \ldots, \Re[\alpha_0^{n_r}], \Im[\alpha_0^{n_r}]]^T$ $\vec{\beta}_0 = [\Re[\beta_0^{(1)}], \Im[\beta_0^{(1)}], \ldots, \Re[\beta_0^{n_r}], \Im[\beta_0^{n_r}]]^T$ $\vec{D}_A = \begin{bmatrix} \Re[\alpha_1^{(1)}] - \Im[\alpha_1^{(1)}] \Re[\alpha_3^{(1)}] - \\ \Im[\alpha_3^{(1)}] \Re[\alpha_4^{(1)}] - \Im[\alpha_4^{(1)}] \\ \Im[\alpha_1^{(1)}] \Re[\alpha_1^{(1)}] \Im[\alpha_3^{(1)}] \Re[\alpha_3^{(1)}] \Im[\alpha_4^{(1)}] \Re[\alpha_4^{(1)}] \\ \vdots \\ \Re[\alpha_1^{n_r}] - \Im[\alpha_1^{(n_r)}] \Re[\alpha_3^{(n_r)}] - \\ \Im[\alpha_3^{(n_r)}] \Re[\alpha_4^{(n_r)}] - \Im[\alpha_4^{(n_r)}] \\ \Im[\alpha_1^{n_r}] \Re[\alpha_1^{(n_r)}] \Im[\alpha_3^{(n_r)}] \Re[\alpha_3^{(n_r)}] \Im[\alpha_4^{(n_r)}] \Re[\alpha_4^{(n_r)}] \end{bmatrix}$ $\vec{D}_B = \begin{bmatrix} \Re[\beta_1^{(1)}] - \Im[\beta_1^{(1)}] \Re[\beta_3^{(1)}] - \\ \Im[\beta_3^{(1)}] \Re[\beta_4^{(1)}] - \Im[\beta_4^{(1)}] \\ \Im[\beta_1^{(1)}] \Re[\beta_1^{(1)}] \Im[\beta_3^{(1)}] \Re[\beta_3^{(1)}] \Im[\beta_4^{(1)}] \Re[\beta_4^{(1)}] \\ \vdots \\ \Re[\beta_1^{n_r}] - \Im[\beta_1^{(n_r)}] \Re[\beta_3^{(n_r)}] - \\ \Im[\beta_3^{(n_r)}] \Re[\beta_4^{(n_r)}] - \Im[\beta_4^{(n_r)}] \\ \Im[\beta_1^{n_r}] \Re[\beta_1^{(n_r)}] \Im[\beta_3^{(n_r)}] \Re[\beta_3^{(n_r)}] \Im[\beta_4^{(n_r)}] \Re[\beta_4^{(n_r)}] \end{bmatrix}$ $\alpha_1^{(k)} = \sqrt{|h_{k,1}|^2 + |h_{k,2}|^2}$ $\alpha_0^{(k)} = \dfrac{r_{k,1} h_{k,1}^* + r_{k,2}^* h_{k,2}}{\alpha_1^{(k)}}$ $\alpha_3^{(k)} = \dfrac{h_{k,1}^* h_{k,3} + h_{k,2} h_{k,4}^*}{\alpha_1^{(k)}}$ $\alpha_4^{(k)} = \dfrac{h_{k,1}^* h_{k,4} + h_{k,1} h_{k,3}^*}{\alpha_1^{(k)}}$ $\beta_2^{(k)} = \alpha_1^{(k)}$ $\beta_0^k = \dfrac{r_{k,1} h_{k,2}^* - r_{k,2}^* h_{k,1}}{\beta_2^{(k)}}$ $\beta_3^{(k)} = \dfrac{h_{k,2}^* h_{k,3} - h_{k,1} h_{k,4}^*}{\beta_2^{(k)}}$ $\beta_4^{(k)} = \dfrac{h_{k,2}^* h_{k,4} + h_{k,1} h_{k,3}^*}{\beta_2^{(k)}}$ and k indicates an index of a receiving antenna.

In this case, if a constant Z is defined as Z=min($2n_r$, 6), the ML metric is given as follows.

$M = \sum_{i=1}^{Z} \left| \sum_{j=1}^{6} F_{ij}^A (\rho_j^A - x_j^A) \right|^2 + \sum_{i=1}^{Z} \left| \sum_{j=1}^{6} F_{ij}^B (\rho_j^B - x_j^B) \right|^2$ $= \sum_{i=1}^{Z-1} \left| \sum_{j=1}^{6} F_{ij}^A (\rho_j^A - x_j^A) \right|^2 + \left| \sum_{j=Z}^{6} F_{4j}^A (\rho_j^A - x_j^A) \right|^2$ $\left| \sum_{j=Z}^{6} F_{4j}^A (\rho_j^A - x_j^A) \right|^2 \sum_{i=1}^{Z-1} \left| \sum_{j=1}^{6} F_{ij}^B (\rho_j^B - x_j^B) \right|^2 + \left| \sum_{j=Z}^{6} F_{4j}^B (\rho_j^B - x_j^B) \right|^2$ If the given numerical formula is solved by the above-described method, XAj(j=3, 4, 5, and 6) is estimated as represented by Equation 22.

$$x_j^A \in \{-1,1\} \cap [LB_j^A, UB_j^A]$$

$$j=3,4,5,6 \qquad \text{(Equation 22)}$$

If $F^A_{Zj}$ is a positive number, $$LB_j^A = \frac{Q_A - \sqrt{C} - 2\sum_{j=Z}^{i-1}|F_{Z,j}^A| - 2\sum_{k=j+1}^{6}\bar{u}_k^A}{F_{2,5}^A} - 1$$

$$UB_j^A = \frac{Q_A + \sqrt{C} - 2\sum_{k=j+1}^{6}\bar{u}_k^A}{|F_{Z,j}^A|} - 1.$$

If $F^A_{Zj}$ is a negative number, $$LB_j^A = -\frac{Q_A + \sqrt{C} - 2\sum_{k=j+1}^{6}\bar{u}_k^A}{|F_{Z,j}^A|} + 1$$

$$UB_j^A = -\frac{Q_A - \sqrt{C} - 2\sum_{j=Z}^{i-1}|F_{Z,j}^A| - 2\sum_{k=j+1}^{6}\bar{u}_k^A}{|F_{Z,j}^A|} + 1.$$

In the same method, $X^B_j$ (j=3, 4, 5, and 6) is estimated, and estimate values for imaginary and real parts of $x_3$ and $x_4$ can be calculated by using Equations 12 to 15. The following processes are the same as those in the case in which one receiving antenna exists.

The description has been given to the case of 4-QAM. However, the result that is obtained above can be generalized to the case of arbitrary M-QAM. First, for better comprehension and ease of description, a case of 16-QAM is exemplified. In this case, as a value of each of $x^A_j$ and $x^B_j$, any one of $\{-3, -1, 1, 3\}$ is selected.

First, if estimating $x^A_j$, the following conversion is performed as proposed by Z. Yang, C. Liu, and J. He. If a value of $F^A_{2,j}$ is a positive number, with respect to $x^A_j$ corresponding to j, the following conversion is performed.

$$b_j^A = \frac{3 + x_j^A}{2}$$

If a value of $F^A_{2,j}$ is a negative number, with respect to $x^A_j$ corresponding to j, the following conversion is performed.

$$b_j^A = \frac{3 - x_j^A}{2}$$

If representing the value of $x^A_j$ in a form of a binary number, it is as follows.

$$b_j^A = 2b_{1j}^A + b_{0j}^A$$

$$b_{ij}^A \in \{0,1\}$$

If using the numerical formula, an estimated value for $x^A_j$ can be calculated as follows.

$$b_{0,6}^A \in \{0,1\} \cap \left[\frac{Q_A - \sqrt{C} - 6\sum_{j=2}^{5}|F_{2,j}^A| - 4|F_{2,6}^A|}{2|F_{2,6}^A|}, \frac{Q_A + \sqrt{C}}{2|F_{2,6}^A|}\right]$$

In this way, an estimated value for $b^B_j$ can be calculated as follows.

$$b_{0,6}^B \in \{0,1\} \cap \left[\frac{Q_B - \sqrt{C} - 6\sum_{j=2}^{5}|F_{2,j}^B| - 4|F_{2,6}^B|}{2|F_{2,6}^B|}, \frac{Q_B + \sqrt{C}}{2|F_{2,6}^B|}\right]$$

If $F^A_{2,6}$ and $F^B_{2,6}$ have the same code, $X^A_6$ and $X^B_6$ have the same value. As a result, $b^A_6$ and $b^B_6$ have the same value. Thus, the conditions $b^A_{0,6}=b^B_{0,6}$ and $b^A_{1,6}=b^B_{1,6}$ are satisfied.

However, if $F^A_{2,6}$ and $F^B_{2,6}$ have different codes, respectively, the conditions $b^A_{0,6}=b^B_{0,6}$ and $b^A_{1,6}=b^B_{1,6}$ are not satisfied. For example, when it is assumed that $F^A_{2,6}$ is a positive number and $F^B_{2,6}$ is a negative number, the following numerical formula is satisfied.

$$b_6^A = \frac{3 + x_6^A}{2} = \frac{3 + x_6^B}{2} = 3 - \frac{3 - x_6^B}{2} = 3 - b_6^B$$

Here, any one of $\{0, 1, 2, 3\}$ is selected as a value of each of the constants $b^A_6$ and $b^B_6$. Accordingly, $b^B_6$ can be considered as a complement of 1 with respect to $b^A_6$. Thus, using $b^A_{0,6}$ and $b^B_{0,6}$, $b_{0,6}$ can be estimated as represented by Equation 23.

$$\bar{b}_{0,6} := \begin{cases} b_{0,6}^A \cap b_{0,6}^B, \ldots & \text{if} \operatorname{sign}(F_{2,6}^A) = \operatorname{sign}(F_{2,6}^B) \\ b_{0,6}^A \cap \overline{b_{0,6}^B}, \ldots & \text{otherwise} \end{cases} \quad \text{(Equation 23)}$$

In this case, a dot • indicates a complement of 1.

In the same method, $b_{0,6}$ can be estimated as follows.

$$\bar{b}_{1,6} := \begin{cases} b_{1,6}^A \cap b_{1,6}^B, \ldots & \text{if} \operatorname{sign}(F_{2,6}^A) = \operatorname{sign}(F_{2,6}^B) \\ b_{1,6}^A \cap \overline{b_{1,6}^B}, \ldots & \text{otherwise} \end{cases} \quad \text{(Equation 24)}$$

In Equation 24, $$b_{1,6}^B \in \{0,1\} \cap \left[\frac{Q_A - \sqrt{C} - 6\sum_{j=2}^{5}|F_{2,j}^A| - 2\bar{b}_{0,6}|F_{2,6}^A|}{4|F_{2,6}^A|},\right.$$
$$\left.\frac{Q_A + \sqrt{C} - 2\bar{b}_{0,6}|F_{2,6}^A|}{4|F_{2,6}^A|}\right]$$

If $F^A_{2,6}$ and $F^B_{2,6}$ have the same code, $$b^B_{1,6} \in \{0, 1\} \cap \left[ \frac{Q_B - \sqrt{C} - 6\sum_{j=2}^{5}|F^B_{2,j}| - 2\overline{b}_{0,6}|F^B_{2,6}|}{4|F^B_{2,6}|}, \frac{Q_B + \sqrt{C} - 2\overline{b}_{0,6}|F^B_{2,6}|}{4|F^B_{2,6}|} \right],$$

If $F^A_{2,6}$ and $F^B_{2,6}$ have different codes, respectively, in a numerical formula for $b^B_{1,6}$, the value of $\overline{b}_{0,6}$ needs to be changed to a complement of 1. An imaginary part for $X_4$ is estimated as represented by Equation 25.

$$\Im[x4] = \text{sign}(F^A_{2,6})(2(2\overline{b}_{1,6} + \overline{b}_{0,6}) - 3) \quad \text{(Equation 25)}$$

In the same method, a real part of $X_4$ and imaginary and real parts of $X_3$ can be estimated. That is, imaginary and real parts of $X_4$ and imaginary and real parts of $X_3$ are sequentially estimated. At this time, imaginary and real parts, each of which is composed of a plurality of bits, are estimated in an order from the LSB (least significant bit) to the MSB (most significant bit).

Then, $\hat{x}_1$ and $\hat{x}_2$ are estimated by using Equations 17 and 18. In order to obtain $\hat{x}_1$ and $\hat{x}_2$ that are ML estimated values, points that are close to $\hat{x}_1$ and $\hat{x}_2$, are selected from among all points in a constellation.

The case of 16-QAM has been described. The case of M-QAM will now be described.

In the case of M-QAM, as a value of each of $X^A_j$ and $X^B_j$, any one of $\{-\sqrt{M}+1, -\sqrt{M}+3, \ldots, -1, 1, \ldots, \sqrt{M}-3, \sqrt{M}-1\}$ is selected. In this case, if a value of $F^A_{2,j}$ is a positive number, a conversion like Equation 26 is performed on $X^A_j$ that corresponds to j.

$$b^A_j = \frac{\sqrt{M} - 1 + x^A_j}{2} \quad \text{(Equation 26)}$$

If a value of $F^A_{2,j}$ is a negative number, a conversion like Equation 27 is performed on $X^A_j$ that corresponds to j.

$$b^A_j = \frac{\sqrt{M} - 1 - x^A_j}{2} \quad \text{(Equation 27)}$$

A detection method, which is executed after the conversion is performed, is the same as the method that is described in the 16-QAM.

Finally, in order to improve detection performance, detection ordering is performed. In the above-described method, $x_3$ and $x_4$ are estimated and then $x_1$ and $x_2$ are estimated. According to this method, when a channel through which $x_3$ and $x_4$ pass is superior to a channel through which $x_1$ and $x_2$ pass, superior performance is obtained. However, when the channel through which $x_3$ and $x_4$ pass is inferior to the channel through which $x_1$ and $x_2$ pass, superior performance cannot be obtained due to error propagation.

In this case, after estimating $x_1$ and $x_2$, $x_3$ and $x_4$ are estimated. In general, when Equation 28 is satisfied, $x_1$ and $x_2$ are first estimated. When Equation 28 is not satisfied, $x_3$ and $x_4$ are first estimated.

$$\sum_{k=1}^{n_r}(|h_{k,1}|^2 + |h_{k,2}|^2) \geq \sum_{k=1}^{n_r}(|h_{k,3}|^2 + |h_{k,4}|^2) \quad \text{(Equation 28)}$$

The detection method will now be described in detail with reference to FIG. 2.

Figure 2:
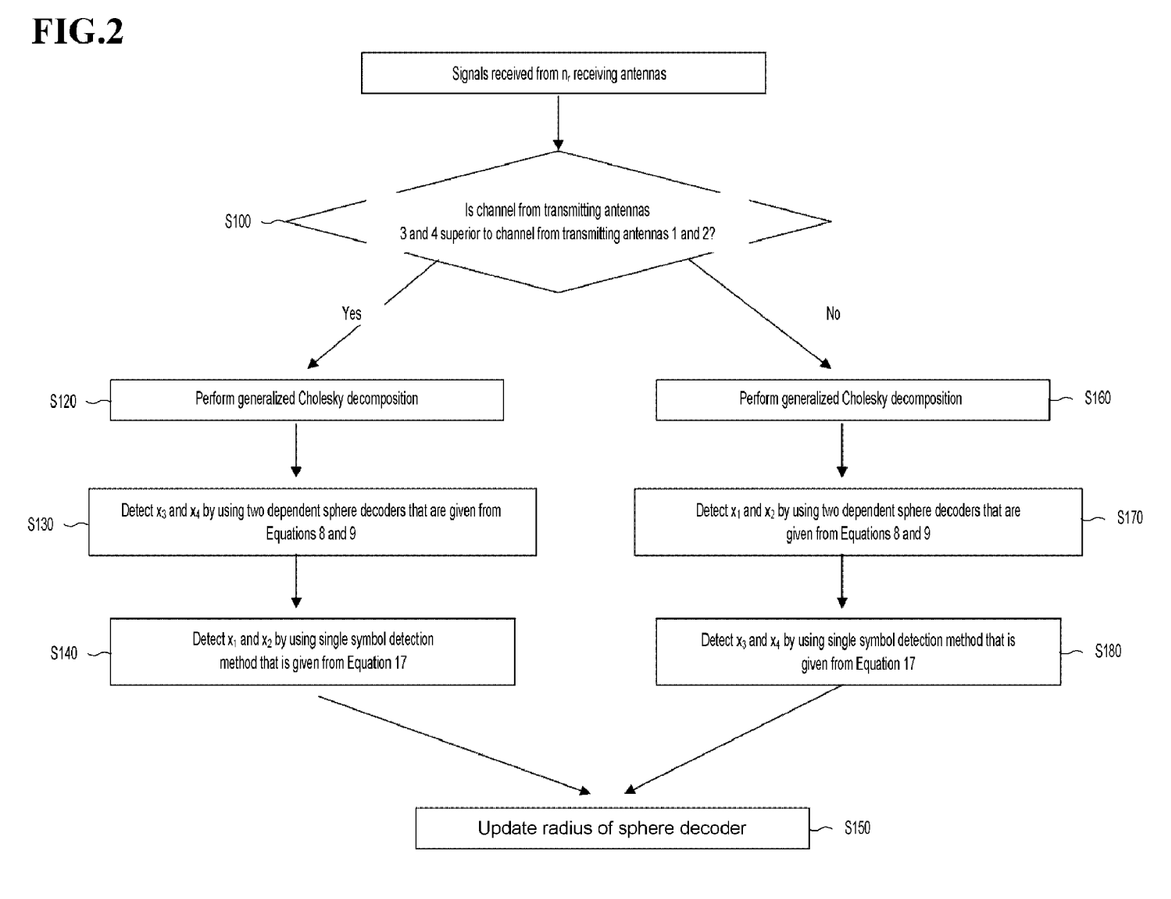
FIG. 2 is a flowchart illustrating a detection method according to an exemplary embodiment of the present invention.

FIG. 2 is a flowchart illustrating a detection method according to an exemplary embodiment of the present invention.

As shown in FIG. 2, if receiving signals from $n_r$ receiving antennas (Step S100), it is determined which channel is superior from among a plurality of channels through which the signals are received (Step S110). In the exemplary embodiment of the present invention, since the detection of the signals from four antennas is exemplified, it is determined whether a channel from transmitting antennas 3 and 4 is superior to a channel from transmitting antennas 1 and 2.

When it is determined that the channel from the transmitting antennas 3 and 4 is superior to the channel from the transmitting antennas 1 and 2, Cholesky decomposition is performed in order to calculate F (in Equation 6, $F_A$ and $F_B$) of the ML metric that is generated for the purpose of performing sphere decoding (Step S120). In this case, since the Cholesky decomposition is already well-known, a detailed description thereof will be omitted in the exemplary embodiment of the present invention.

If the ML metric is calculated by performing the Cholesky decomposition, $x_3$ and $c_4$ are detected by using two dependent sphere decoders (Step S130). Since the method of detecting $x_3$ and $c_4$ by using the sphere decoders is already well-known, a detailed description thereof will be omitted in the exemplary embodiment of the present invention.

If $x_3$ and $c_4$ are detected, $x_1$ and $x_2$ are detected by a single symbol detection method using Equation 17 (Step S140). When detecting $x_1$ and $x_2$, an Alamouti decoding scheme is used.

Steps S120 to S140 are performed when the channel from the transmitting antennas 3 and 4 is superior to the channel from the transmitting antennas 1 and 2. Meanwhile, when the channel from the transmitting antennas 1 and 2 is superior to the channel from the transmitting antennas 3 and 4, after Cholesky decomposition is performed (Step S160), $x_1$ and $x_2$ are detected by using a sphere decoder (Step S170) and $x_3$ and $x_4$ are then detected by using the single symbol detection method (Step S180).

As described above, after $x_1$, $x_2$, $x_3$ and $x_4$ are all detected, the radius of a sphere decoder is updated (Step S150). The detection method is repeatedly performed until only one constellation point exists in the updated radius of the sphere decoder.

Referring to FIGS. 3 to 6, the running times and the CPU clocks when using the 4-QAM method and the 16-QAM method according to the exemplary embodiment of the present invention are compared with the running time and the CPU clock when using the method according to the related art.

Figure 3:
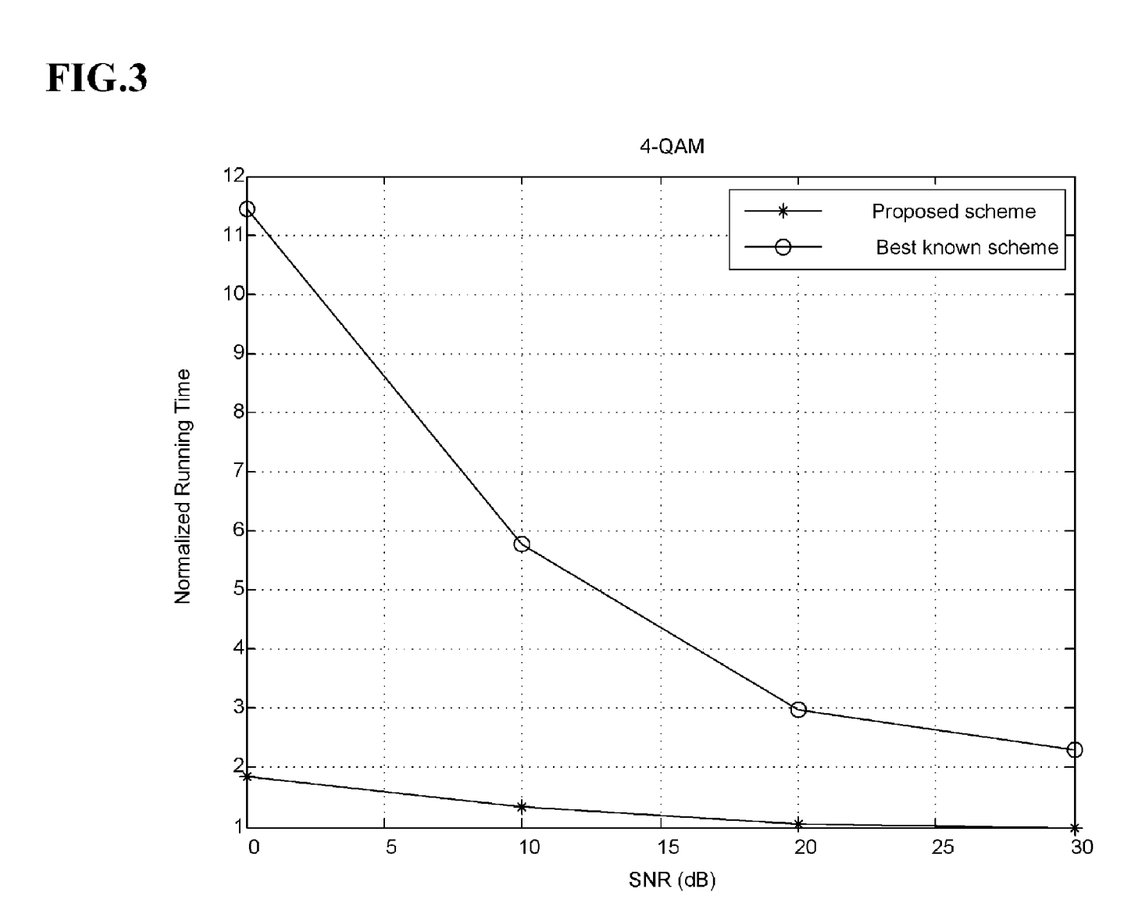
FIG. 3 is an exemplary view illustrating comparison results between running times in a 4-QAM method according to an exemplary embodiment of the present invention and a method according to the related art.
Figure 4:
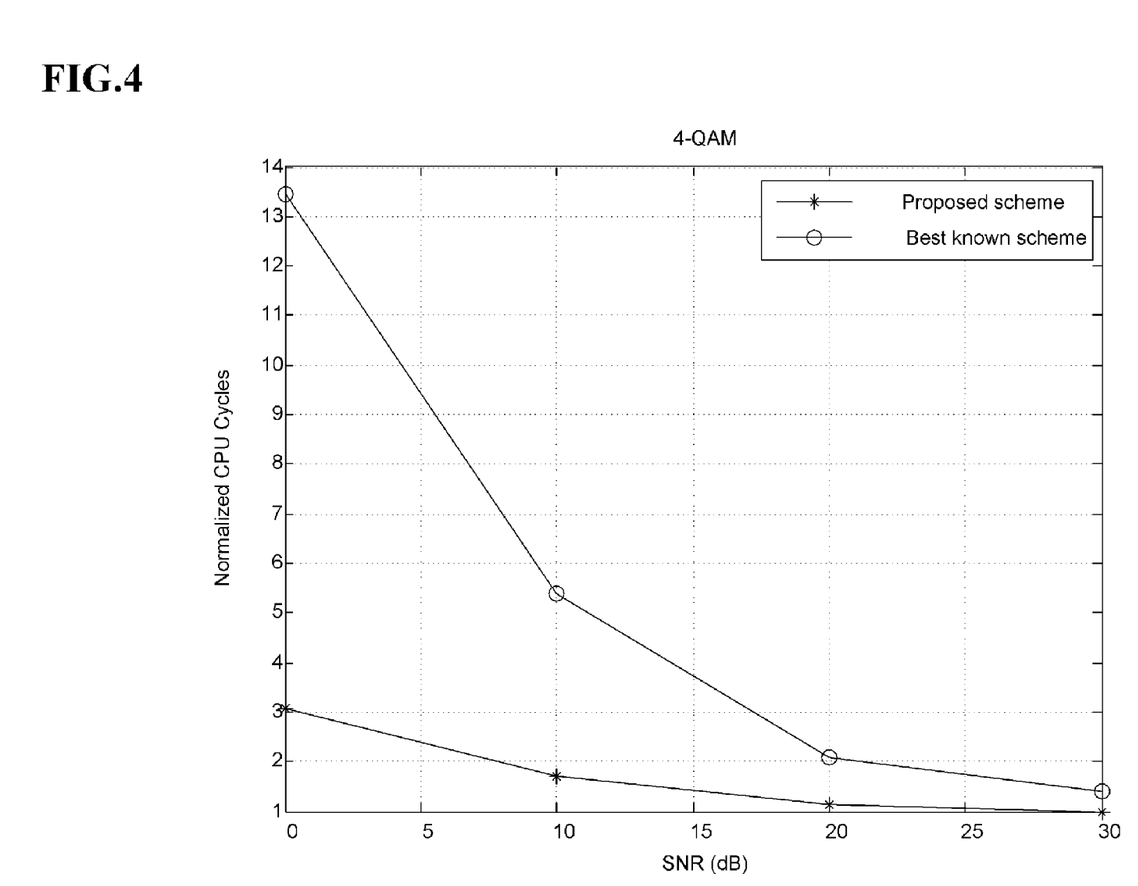
FIG. 4 is an exemplary view illustrating comparison results between CPU clocks in a 4-QAM method according to an exemplary embodiment of the present invention and a method according to the related art.

FIGS. 3 and 4 are exemplary views illustrating the comparison result between a running time and the number of CPU clocks when using a 4-QAM method according to an exemplary embodiment of the present invention and a running time and the number of CPU clocks when using a method according to the related art.

In this case, the scheme, which is proposed by Z. Yang, C. Liu, and J. He, is called a "best known scheme". FIG. 3 shows a comparison result between running times when using a detection method according to an exemplary embodiment of the present invention and when using the detection method according to the best known scheme. As shown in FIG. 3, it can be understood that the running time when using the detection method according to the exemplary embodiment of the present invention is shorter than the running time when using the detection method according to the best known scheme. In particular, an improvement width is large in a region having a low SNR (signal-to-noise ratio).

As shown in FIG. 4, it can be understood that the number of CPU clocks when using the 4-QAM method according to the exemplary embodiment of the present invention is smaller than the number of CPU clocks when using the method according to the best known scheme. In this case, the number of CPU clocks is in proportion to complexity of a system. When the number of CPU clocks increases, the complexity of the system increases.

Figure 5:
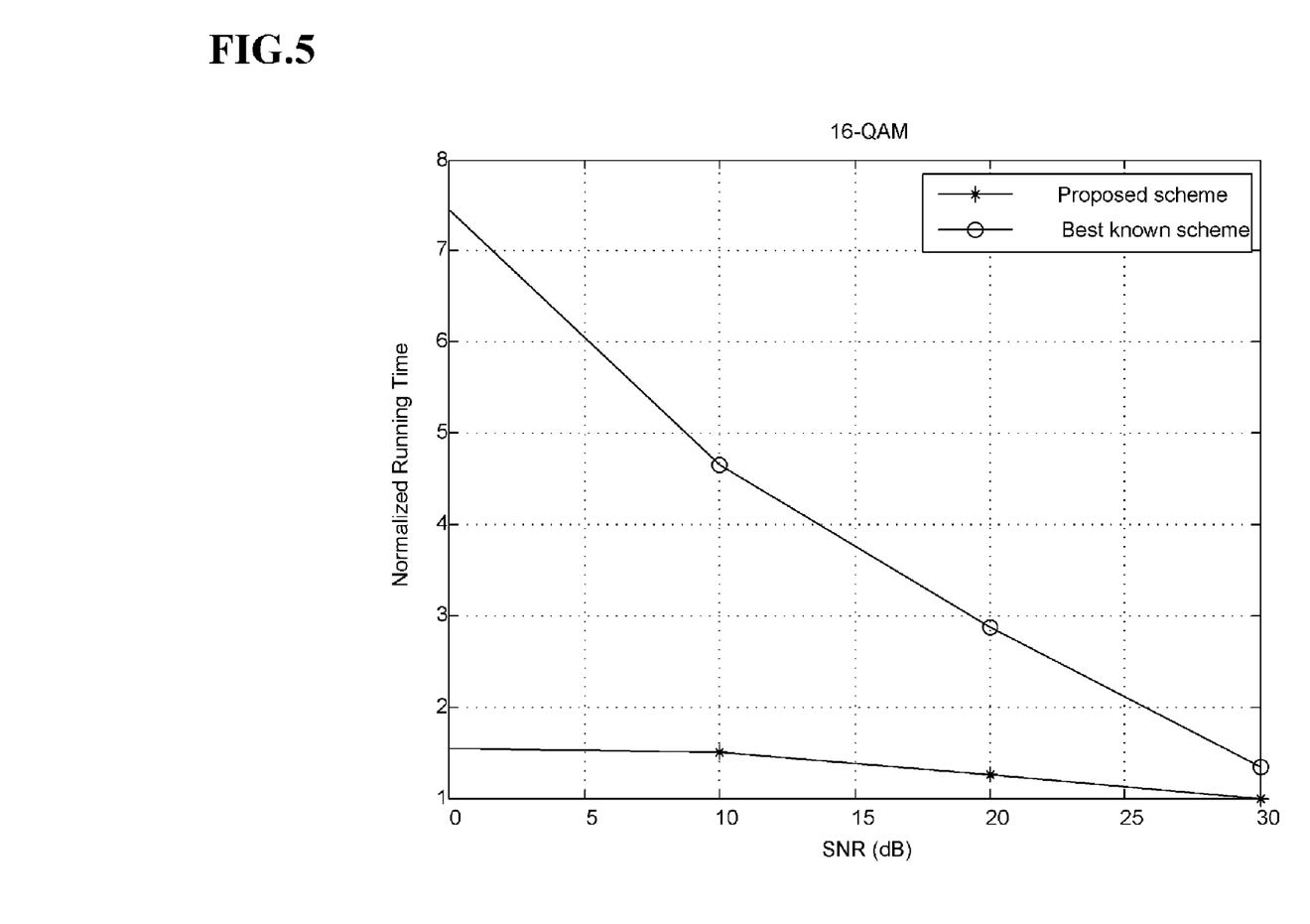
FIG. 5 is an exemplary view illustrating comparison results between running times in a 16-QAM method according to an exemplary embodiment of the present invention and a method according to the related art.
Figure 6:
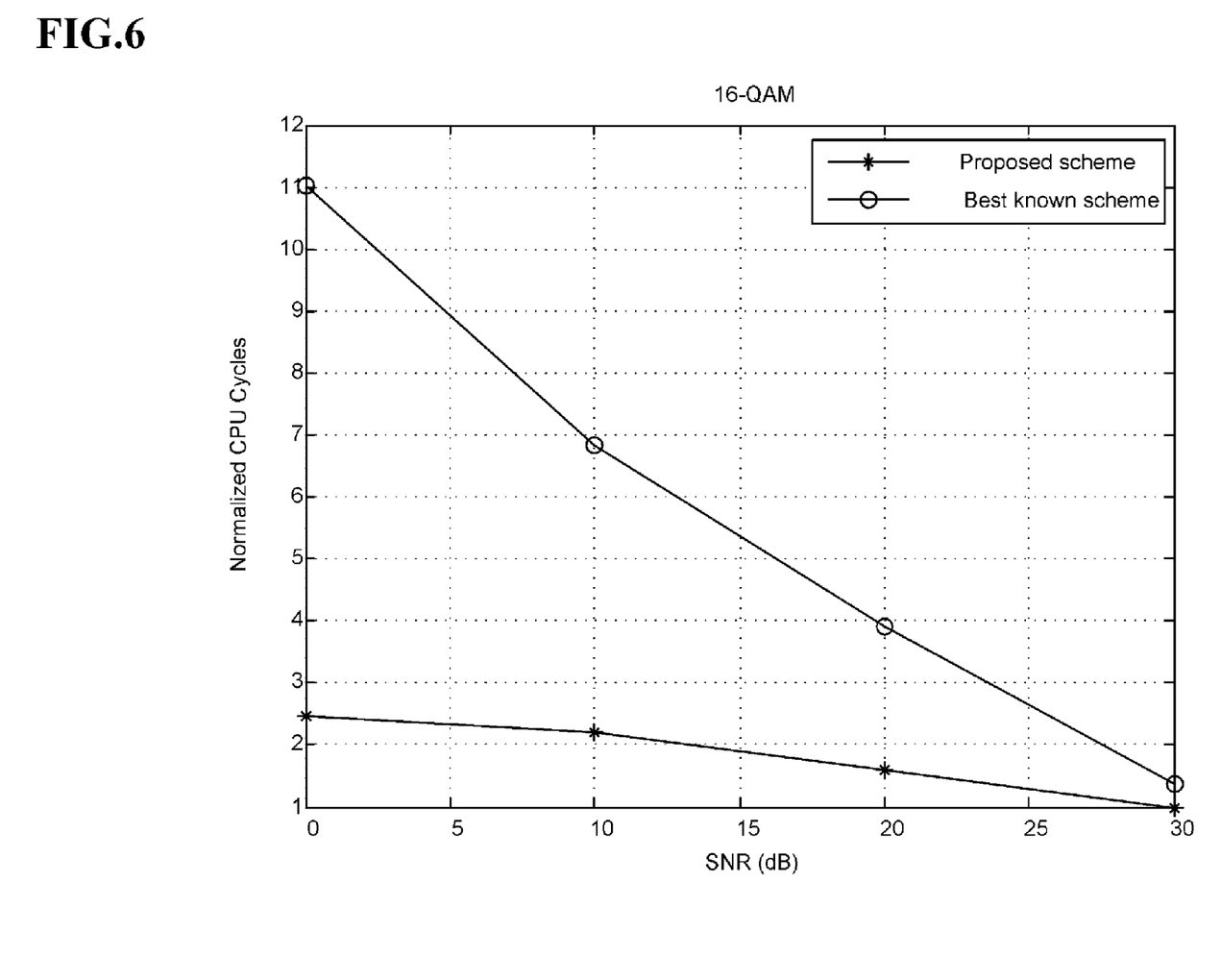
FIG. 6 is an exemplary view illustrating comparison results between CPU clocks in a 16-QAM method according to an exemplary embodiment of the present invention and a method according to the related art.

FIGS. 5 and 6 are exemplary views illustrating a comparison result between a running time and the number of CPU clocks when using a 16-QAM method according to an exemplary embodiment of the present invention and a running time and the number of CPU clocks when using a method according to the related art.

As shown in FIGS. 5 and 6, it can be understood that the detection method according to the exemplary embodiment of the present invention using the 16-QAM method is superior to the detection method according to the related art in terms of the running time and the number of CPU clocks. This point is the same as that of the 4-QAM method.

In this case, a program that realizes a function corresponding to the structure according to the exemplary embodiment of the present invention and a recording medium that has the program recorded therein are within the range of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the above-described exemplary embodiment, when detecting the space-time code B for the four transmitting antennas, as compared with the case of using the existing sphere decoding scheme, it is possible to provide the same ML performance with low complexity.

What is claimed is:

1. A method of detecting a space-time code for a plurality of transmitting antennas, the method comprising:
   receiving, by at least one receiving antenna, signals that are transmitted from the plurality of transmitting antennas, and determining channel statuses of the received signals for the transmitting antennas to determine a detection order of symbol groups, the received signals being divided into a first symbol group and a second symbol group each of which includes a pair of a first symbol and a second symbol, each symbol including imaginary and real parts each having one or more bits;
   calculating a ML (maximum likelihood) metric for the first symbol group if detection on the first symbol group is determined according to the channel statuses;
   performing sphere decoding on the calculated ML metric and sequentially detecting an imaginary part of one bit and a real part of one bit for the first symbol and the second symbol of the first symbol group; and
   detecting, by a detector, the second symbol group as a single symbol on the basis of the detected first symbol group.

2. The method of claim 1, wherein the ML metric is calculated by an intersection of results that are obtained by performing two sphere decoding schemes.

3. The method of claim 2, wherein the ML metric is restricted to be smaller than a constant that is defined in advance.

4. The method of claim 3, wherein, when one receiving antenna exists, the ML metric is calculated using the received signals and channel gains between the plurality of transmitting antennas and the receiving antenna.

5. The method of claim 4, wherein, when a plurality of receiving antennas exist, the ML metric is calculated using the received signals in the plurality of receiving antennas and channel gains between the plurality of transmitting antennas and the plurality of receiving antennas.

6. The method of claim 1, wherein the second symbol group is detected by a single symbol detection method.

7. The method of claim 6, wherein the single symbol detection method is an Alamouti decoding scheme.

8. The method of claim 1, wherein the imaginary and real parts of the first and second symbols, which are composed of two bits or more, are detected in an order from the LSB (least significant bit) to the MSB (most significant bit).

9. The method of claim 8, wherein the imaginary part of the second symbol is estimated using the following equations:

$$\bar{b}_{0,6} := \begin{cases} b_{0,6}^A \cap b_{0,6}^B, \ldots & \text{if } sign(F_{2,6}^A) = sign(F_{2,6}^B) \\ b_{0,6}^A \cap b_{0,6}^B, \ldots & \text{otherwise,} \end{cases}$$

$$\bar{b}_{1,6} := \begin{cases} b_{1,6}^A \cap b_{1,6}^B, \ldots & \text{if } sign(F_{2,6}^A) = sign(F_{2,6}^B) \\ b_{1,6}^A \cap b_{1,6}^B, \ldots & \text{otherwise,} \end{cases} \text{ and}$$

$$\Im[x4] = sign(F_{2,6}^A)(2(2\bar{b}_{1,6} + \bar{b}_{0,6}) - 3).$$

10. The method of claim 1, wherein the ML metric is calculated by performing Cholesky decomposition on the first symbol group or the second symbol group.

11. The method of claim 10, further comprising detecting the second symbol group as a single symbol and updating a variable of the radius of a sphere decoder that becomes a criterion when detecting the space-time code.

12. The method of claim 11, wherein, if each of detected values for the first symbol group and the second symbol group is larger than the radius of the sphere decoder, it is informed that there is no constellation in the variable of the radius of the sphere decoder.

13. The method of claim 12, wherein the detection order is that a symbol group that passed through a superior channel is first detected.

* * * * *